(12) United States Patent
Yerli (10) Patent No.: US 10,542,569 B2
(45) Date of Patent: Jan. 21, 2020

(54) COMMUNITY-BASED COMMUNICATION NETWORK SERVICES

(71) Applicant: Calay Venture S.à r.l., Bettembourg (LU)

(72) Inventor: Cevat Yerli, Frankfurt am Main (DE)

(73) Assignee: TMRW FOUNDATION IP S. À R.L., Bettembourg (LU)

( * ) Notice: Subject to any disclaimer, the term of this patent is extended or adjusted under 35 U.S.C. 154(b) by 352 days.

(21) Appl. No.: 14/820,372

(22) Filed: Aug. 6, 2015

(65) Prior Publication Data
US 2017/0041964 A1 Feb. 9, 2017

(51) Int. Cl.
| | | |
|---|---|---|
| *H04W 76/00* | (2018.01) | |
| *H04W 12/06* | (2009.01) | |
| *H04W 84/12* | (2009.01) | |
| *H04L 9/00* | (2006.01) | |
| *H04W 76/10* | (2018.01) | |

(52) U.S. Cl.
CPC .................................. *H04W 76/10* (2018.02)

(58) Field of Classification Search
None
See application file for complete search history.

(56) References Cited

U.S. PATENT DOCUMENTS

| | | | | |
|---|---|---|---|---|
| 6,173,402 B1* | 1/2001 | Chapman | ............ | G06F 21/6218 713/182 |
| 6,971,005 B1* | 11/2005 | Henry | ................ | H04L 63/0815 713/155 |
| 7,441,043 B1* | 10/2008 | Henry | ................ | H04L 29/1233 709/238 |
| 7,788,709 B1* | 8/2010 | Henry | .................... | G06Q 40/00 380/270 |
| 9,462,468 B2* | 10/2016 | Ding | ..................... | H04W 12/06 |
| 2003/0163733 A1* | 8/2003 | Barriga-Caceres | ..... | G06F 21/33 726/5 |
| 2004/0133689 A1* | 7/2004 | Vasisht | ............ | H04L 29/12216 709/228 |
| 2004/0255119 A1* | 12/2004 | Ukeda | ..................... | G06F 21/34 713/169 |

(Continued)

FOREIGN PATENT DOCUMENTS

JP 2002259344 A * 9/2002

*Primary Examiner* — Ayaz R Sheikh
*Assistant Examiner* — Tarell A Hampton
(74) *Attorney, Agent, or Firm* — Christensen O'Connor Johnson Kindness PLLC (57) ABSTRACT

A method for accessing communication networks includes receiving by a device an identification of a communication network; determining whether the identification corresponds to a registered communication network; if the identification corresponds to a registered communication network, generating a password for accessing the communication network by applying a cryptographic function parameterized with a secret value associated with the communication network to the identification; and automatically establishing a connection of the device to the communication network using the generated password. Furthermore, methods for managing access to communication networks and providing communication networks are disclosed. A corresponding client device, service infrastructure and service provider infrastructure are also detailed.

12 Claims, 6 Drawing Sheets

(56) References Cited

U.S. PATENT DOCUMENTS

| | | | |
|---|---|---|---|
| 2005/0260973 A1* | 11/2005 | van de Groenendaal | H04L 63/102 455/411 |
| 2007/0036358 A1* | 2/2007 | Nguyen | H04L 41/0806 380/270 |
| 2007/0206527 A1* | 9/2007 | Lo | H04L 63/0272 370/328 |
| 2008/0025278 A1* | 1/2008 | Hoecker | H04W 76/02 370/338 |
| 2008/0109880 A1* | 5/2008 | Shiu | H04W 12/06 726/3 |
| 2008/0198823 A1* | 8/2008 | Shiu | H04W 48/20 370/338 |
| 2009/0073923 A1* | 3/2009 | Homma | H04W 60/00 370/328 |
| 2009/0168735 A1* | 7/2009 | Mizukoshi | H04W 12/10 370/338 |
| 2009/0318146 A1* | 12/2009 | Mizukoshi | H04W 60/04 455/435.1 |
| 2010/0290424 A1* | 11/2010 | Collingrige | H04L 12/5692 370/329 |
| 2011/0310875 A1* | 12/2011 | Tysowski | H04W 48/16 370/338 |
| 2011/0320601 A1* | 12/2011 | Becker Hof | H04L 63/08 709/225 |
| 2012/0033568 A1* | 2/2012 | Park | H04W 76/023 370/252 |
| 2012/0284785 A1 | 11/2012 | Salkintzis et al. | |
| 2013/0021949 A1* | 1/2013 | Kaal | H04W 48/16 370/255 |
| 2013/0107806 A1* | 5/2013 | Lee | H04W 48/14 370/328 |
| 2013/0115915 A1* | 5/2013 | Tipton | H04W 12/08 455/411 |
| 2013/0333016 A1* | 12/2013 | Coughlin | H04W 12/06 726/9 |
| 2014/0010225 A1* | 1/2014 | Puregger | H04W 12/06 370/338 |
| 2014/0033288 A1* | 1/2014 | Wynn | H04W 12/08 726/7 |
| 2014/0058770 A1* | 2/2014 | Kim | H04W 4/008 705/5 |
| 2014/0165163 A1* | 6/2014 | Salkintzis | H04W 12/06 726/5 |
| 2014/0282978 A1* | 9/2014 | Lerner | H04L 63/083 726/7 |
| 2015/0055505 A1* | 2/2015 | Lai | H04W 4/12 370/254 |
| 2015/0333965 A1* | 11/2015 | Lee | H04L 45/02 370/254 |
| 2016/0337945 A1* | 11/2016 | Watt | H04W 76/10 |

\* cited by examiner

COMMUNITY-BASED COMMUNICATION NETWORK SERVICES

TECHNICAL FIELD

The present disclosure relates to a method for accessing communication networks and a method for managing access to communication networks. Moreover, the disclosure relates to a client device, a service infrastructure and a provider infrastructure, which may be interconnected, to enable access to communication networks.

BACKGROUND

Communication networks are typically used by client devices in order to connect with other client devices or server devices in order to exchange data. The functionality of a client device heavily relies on access to communication networks, for example, to connect to a server or cloud providing respective services for the client device. However, communication networks, such as Wi-Fi networks or wired LAN networks, require users to enter a password to gain access to the communication network. This may be inconvenient and may even discourage an operator of a client device to connect to a communication network. For example, a provider of a communication network would like to closely tie customers by providing communication networks as a service to the customers and would, therefore, like to provide a fast and convenient access to the communication networks.

However, open networks without any identification or authorization of a potential client device could be open to security hazards to both already-connected client devices and the provider of the communication network, which could be liable for the data transmitted by an unknown, yet connected client device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more of the above-described technical problems may be solved by a described method for accessing communication networks and a respective client device, a method for managing access to communication networks and a respective service infrastructure, as well as a method for providing communication networks and a provider infrastructure as defined in the independent claims. One or more of the aspects described herein may enable convenient, fast and secure access to communication networks.

A first aspect of the present disclosure provides a method for accessing communication networks, comprising receiving, by a device, an identification of a communication network and determining whether the identification corresponds to a registered communication network. If the identification corresponds to a registered communication network, a password for accessing the communication network is generated by applying a cryptographic function parameterized with a secret value associated with the communication network to the identification. Subsequently, a connection of the device to the communication network is automatically established using the generated password.

Hence, the method, which may be a computer-implemented method, provides a device with the ability to connect to a plurality of registered communication networks, wherein the required password is automatically generated by subjecting an identification of the communication network to a (secret) cryptographic function that is adapted to the communication network using the secret value. Hence, the network is protected with a password. However, devices having knowledge of registered communication networks may automatically generate the password to access the communication network. Still, the devices need not store or know the individual passwords of the registered communication networks. Rather, the passwords are generated on demand as soon as a registered communication network is identified by the device.

The availability of the automatic access for a current communication network is determined based on the identification of the current communication network. Hence, establishment of access or an initial handshake can be efficiently performed without requiring extensive computations. The password for accessing the communication network may be entirely generated on the device based on the cryptographic function and the secret value for the communication network.

According to one embodiment, said method further comprises retrieving the secret value for the communication network. After determining that the identification corresponds to a registered communication network, the device may retrieve the secret value locally from storage or remotely from a central entity using a dedicated communication channel provided by the communication network. For example, an access point of the communication network may be set up to enable direct access to the central entity. The device may also use another communication channel or another available communication network to access the central entity in order to retrieve the secret value. The secret value may also be retrieved at an earlier stage, such as a set-up of the device, an update of the device or a previous connection attempt with the communication network, and may be stored or buffered in the device, such as in the (protected) storage of the device.

In another embodiment, said determining includes comparing the identification of the communication network with at least one pattern corresponding to identifications of registered communication networks. The identifications of registered communication networks may be defined according to one or more patterns, such as a prefix, suffix or any other expression defining a pattern. The at least one pattern may be directly retrieved from a central entity, such as the central entity providing secret values. Using the at least one pattern further simplifies the determination of whether a communication network is a registered communication network.

According to one embodiment, each registered communication network is set up with one or more passwords enabling access to the registered communication network, at least one of the one or more passwords being generated by a central entity by applying the cryptographic function parameterized with at least one secret value, including the secret value, associated with the registered communication network to an identification of the registered communication network. The central entity may be the same central entity, which may provide the secret value and/or the patterns of registered communication networks. Hence, the communication network may be any available communication network which may announce or broadcast an identification and which need not have any further knowledge of the access method according to the present disclosure. The only requirement may be that the identification of the communication network follows one or more patterns identifying the communication network as a registered communication network. Hence, a broad variety of existing communication networks may be supported. The only requirement is that the communication network is initially set up with respective passwords enabling access to the communication network.

In an embodiment, the device may be provided with an access module, wherein the access module may be registered with the central entity. Preferably, the access module may be configured to generate the password for accessing the communication network. The access module may be provided on the device as a dedicated hardware or software module or as a combination of both. The access module may be further secured from any unauthorized access by other modules on the device, such as other program code, apps or hardware modules. This may further increase the security of the access method. The access module may communicate with the central entity by receiving updates of information on identifications of the registered communication networks from the central entity, such as updated patterns, and/or respective cryptographic functions and/or secret values, in any combination, which may enable the access module to generate the password for accessing the communication network by applying a respective cryptographic function parameterized with the secret value associated with the communication network to the identification of the communication network. Accordingly, a device without a registered access module cannot access the registered communication networks since the cryptographic functions and the secret values are unknown. Furthermore, the cryptographic function and the secret values cannot be extracted by other modules of the device, since they may be securely stored within the access module. This further increases the security of the device and of the access method.

The terms "or" and "and/or" as used throughout this description refer to an inclusive or logical disjunction. Hence, the terms "A or B" and "A and/or B" mean A or B or both, A and B.

In a further embodiment, the method comprises storing the secret value in a memory area of the device, wherein the memory area is only accessible by the access module, and retrieving, by the access module, the secret value from the memory area. The memory area may be a secured memory area, which may be provided as a dedicated secured memory or secured storage in the device or which may form part of secured memory of the device which may be secured by an operating system or a security layer of the device. Additionally or as an alternative, the secured memory area may be provided on a chip card or any other secured storage device, which may be inserted into the device and which may be accessed by the access module.

In yet another embodiment, identity information associated with the device may be provided to the communication network. Preferably, the identity information may be authenticated or signed by the central entity. Accordingly, the provider of the communication network may have knowledge about devices automatically connected to the communication network via the access method according to embodiments of the present disclosure. Hence, the provider of the communication network may track individual client devices and their users, provide targeted services or log respective data in order to comply with legal requirements of individual countries.

In an embodiment, the cryptographic function is a one-way cryptographic function. Preferably, the cryptographic function may be a hash function. The use of a hash function parameterized with a secret value is advantageous, since respective operations can be performed in an efficient manner. However, it is to be understood that any other one-way cryptographic function may be used to generate the password based on the secret value and the identification of the communication network, such as cryptographic functions used in public key infrastructures and the like. While the cryptographic function may be a fixed function, the secret value may change for each registered communication network. By parameterizing the cryptographic function, an individual (secret) cryptographic function for each registered communication network may be provided.

In yet another embodiment, the communication network is a wireless communication network and the information of the communication network is an SSID of the wireless communication network. The SSID may be broadcasted by the communication networks to any other wireless devices attempting to establish a connection with the wireless communication network. The SSID may be compared to a list of SSIDs of registered wireless communication networks or a respective pattern and, in case of a matching entry, the SSID may be further used to generate the password for accessing the wireless communication network using the parameterized cryptographic function. The secret value may be retrieved using the wireless communication network. Furthermore, the device may request the secret value via a mobile communication network by submitting a request including the identification of the communication network.

According to another aspect of the present disclosure, a client device is provided, wherein the client device comprises a processor and a network interface. The processor is configured to perform a method for accessing communication networks according to one or more embodiments of the present disclosure to access a communication network via the network interface. In particular, the processor may be configured to execute instructions that cause the client device to receive an identification of a communication network; determine whether the identification corresponds to a registered communication network; if the identification corresponds to a registered communication network, generate a password for accessing the communication network by applying a cryptographic function parameterized with a secret value associated with the communication network to the identification; and automatically establish a connection to the communication network using the generated password.

According to one embodiment, the client device may include one or more of an access module and a secured memory area. The access module and/or the secured memory area may be provided as software, hardware or a combination of both. While the processor or a respective functionality or module of an operating layer or operating system of the client device may be configured to continuously receive identifications of available communication networks and to automatically establish connections with the communication network using generated passwords, the comparison of a received identification with the plurality of identifications of registered communication networks as well as the generation of the password in case the identification matches at least one entry of the plurality of identifications may be performed by the access module. Hence, at least parts of the processing may be separated from the general functionality of the client device and included in the dedicated access module in order to further increase the security of the client device.

According to another aspect, a method for managing access to communication networks is provided comprising maintaining data on a plurality of communication networks, said data including, for each communication network, an identification of the communication network and at least one secret value associated with the communication network, wherein the communication network is accessible by one or more passwords, at least one of the one or more passwords being generated by application of a cryptographic function parameterized with the at least one secret value to the identification of the communication network, maintaining data on a plurality of client devices, and distributing information on the identifications of the plurality of communication networks, said cryptographic functions, and/or said at least one secret value to at least some of the plurality of client devices.

The method, which can be a computer-implemented method for execution on a computing device, such as a server computer, of a service infrastructure, mediates access of client devices, which may be client devices used by users of a community, to a plurality of communication networks, which may be individual communication networks provided by a plurality of providers. Since the passwords may be automatically generated by the central entity, the providers need not have any knowledge of a respective (secret) cryptographic function but rather may set up the communication network according to the provided one or more passwords. On the other hand, each of the plurality of client devices need not have any knowledge of individual passwords for the plurality of communication networks but may only be provided with respective information on identifications of registered communication networks, said cryptographic functions and/or said secret values, if required. Accordingly, the passwords for accessing an individual communication network may be generated on demand as soon as one of the client devices attempts to access a registered communication network.

Furthermore, the method allows for management and control of groups of client devices and groups of communication networks. For example, one or more client devices may be provided with information on a subset of the plurality of communication networks, which may be determined based on a profile of the one or more client devices, a geolocation of the one or more client devices and/or any other preferences or parameters associated with the communication networks and the client devices. Furthermore, certain communication networks and/or client devices may be prioritized according to a status or any other features or parameters. This allows for maintenance and management of a large number of communication networks and client devices on the central entity, while individual communication networks may only be provided to a restricted group of client devices, such as members of individual communities or sub-communities, thereby avoiding transmission of a huge amount of information and configuration data while still enabling a large flexibility in accessing communication networks in a convenient way.

According to one embodiment, the method further comprises receiving an identification of a further communication network, generating a password by applying a cryptographic function parameterized with a further secret value to the identification of the further communication network and sending the password to the provider of the further communication network. Accordingly, a provider of a communication network may register with the central entity and may submit the identification of the further communication network to the central entity. The central entity may choose from a variety of available secret values or may generate a dedicated secret value for the further communication network in order to generate at least one password for accessing the further communication network. Furthermore, the central entity may select a plurality of individually parameterized cryptographic functions to generate a plurality of passwords for accessing the further communication network which may all be returned to the provider of the further communication network in order to enable an initialization and set-up of the further communication network. The generation of one or more passwords for access of the further communication network allows for a greater flexibility in allowing individual client devices or groups of client devices to access the further communication network and allows for distinguishing the groups of client devices based on individually selected (parameterized) cryptographic functions. It is to be understood that the plurality of cryptographic functions may be generated based on a single cryptographic base function that is parameterized with individual secret values in order to generate a plurality of passwords, by providing the secret values as additional parameters to the cryptographic base function.

In another embodiment, the method further comprises updating the data on the plurality of communication networks with data on the further communication network, including the identification and the further secret value used to generate the at least one password.

Preferably, said identification of the further communication network is distributed to at least some of the plurality of client devices. Furthermore, the secret value associated with the further communication network may be distributed to the client devices. Accordingly, after distribution of the identification and/or the secret value, the receiving client devices may automatically establish a connection to the further communication network without requiring any further retrieval of the access password or further interaction with the provider of the communication network. As an alternative, the data on the further communication network need not be distributed at all, if it is guaranteed that the identification of the further communication network complies to a format or pattern of identifications of registered communication networks. As soon as a client device attempts to connect to the further communication network, it will determine, based on a comparison of the identification of the further communication network with the pattern, that the further communication network is a registered communication network, and the client device may directly retrieve the secret value for the further communication network. Furthermore, the provider of the communication network may retrieve, via the central entity, information about the individual client devices accessing the further communication network.

In yet another embodiment, the secret value associated with a respective communication network is updated, a new password is generated by applying the cryptographic function parameterized with the updated secret value to the identification of the communication network, and the password is sent to the provider of the communication network.

According to yet another aspect of the present disclosure, a service infrastructure comprising one or more computing devices is provided, wherein at least one of the computing devices is configured to perform a method for managing access to communication networks according to one or more embodiments of the present disclosure. The one or more computing devices may be server devices or storage devices, such as one or more storage devices providing access to a respective database. For example, the service infrastructure may comprise a database for storing the data on the plurality of communication networks. The same database or a further database may store the data on the plurality of client devices. The service infrastructure may further comprise an access interface for providers of communication networks that may be used to register available communication networks with the service infrastructure. Furthermore, the service infrastructure may comprise one or more interfaces to register individual client devices and to distribute data on available communication networks to the client devices.

In particular, according to one embodiment, at least one computing device of the service infrastructure may be configured to maintain data on a plurality of communication networks, including, for each communication network, an identification of the communication network and at least one secret value associated with the communication network, wherein the communication network is accessible by one or more passwords, at least one of the one or more passwords being generated by application of a cryptographic function parameterized with the at least one secret value to the identification of the communication network; maintain data on a plurality of client devices; and distribute information on at least some of the identifications of the plurality of communication networks, said cryptographic function and/or said at least one secret value to at least some of the plurality of client devices.

According to yet another aspect, a method for providing communication networks is defined, wherein the method comprises setting up a communication network with an identification, registering the communication network with a central entity, including transmitting the identification to the central entity and receiving one or more passwords from the central entity, wherein at least one of the one or more passwords is generated by the central entity using a cryptographic function parameterized with at least one secret value applied to the identification of the communication network, and setting up the communication network with the one or more passwords, thereby enabling access to the communication network using at least one of the one or more passwords.

Accordingly, communication networks may be set up by a provider and registered with the central entity in order to retrieve one or more passwords that may be used to set up the communication network. By using the central entity, the provider may make the communication network available to a community without requiring a distribution of the passwords to individual client devices of the community and, on the other hand, knowing that only authorized client devices registered with the central entity are allowed to access the communication network by individually generating at least one of the one or more passwords on demand. This enables a provision of communication networks that is secure and easy to use for both the client devices and the provider of the communication network. Furthermore, the communication network may be any kind of available or new communication network, which need not provide any functionality for generating the access password. These passwords are, rather, generated by the central entity and by the individual client devices which desire to access the communication network.

In yet another aspect, a provider infrastructure is provided, the provider infrastructure comprising a communication network and at least one management device, the management device being configured to perform the method for providing communication networks according to one or more embodiments of the present disclosure. In particular, the management device may be configured to set up the communication network with an identification; register the communication network with a central entity, including transmitting the identification to the central entity and receiving one or more passwords from the central entity, wherein at least one of the one or more passwords is generated by the central entity using a cryptographic function parameterized with at least one secret value applied to the identification of the communication network; and set up the communication network with the one or more passwords, thereby enabling access to the communication network using at least one of the one or more passwords.

According to yet another aspect of the present disclosure, a computer-readable medium having instructions stored thereon is provided, wherein said instructions, in response to execution by a computing device, cause said computing device to automatically perform a method according to embodiments of the present disclosure. In particular, said computing device may correspond to the client device according to one or more embodiments of the present disclosure, to the at least one computing device of the service infrastructure according to one or more embodiments of the present disclosure and/or to the management device of the provider infrastructure according to one or more embodiments of the present disclosure and may perform the respective method steps in any combination.

BRIEF DESCRIPTION OF THE DRAWINGS

The specific features, aspects and advantages of the present disclosure will be better understood with regard to the following description and accompanying drawings where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
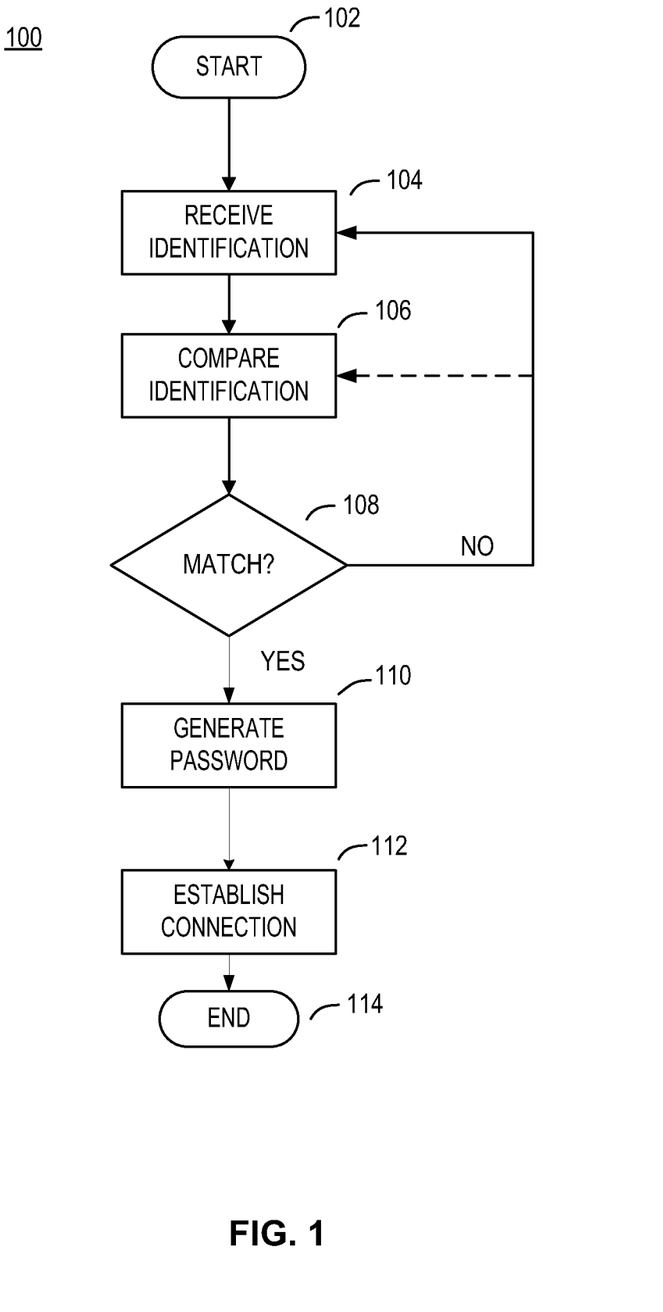
FIG. 1 shows a flow chart of a method for accessing communication networks according to an embodiment of the present disclosure.

FIG. 1 shows a flow chart of a method for accessing communication networks according to one embodiment of the present disclosure. The method 100 may be performed on a device, such as a client device or a communication device and may start in item 102. The method 100 may proceed with item 104, wherein identifications of available communication networks may be received. In item 106, at least one of the received identifications of the available communication networks may be compared to at least one pattern corresponding to identifications of registered communication networks. If the compared identification matches the pattern as determined in item 108, the method 100 may proceed with item 110, where a password for accessing the communication network may be generated. If no match is found, the method 100 may proceed with item 104 and receive further identifications of available communication networks. As an alternative, the method 100 may directly proceed with item 106 if more than one identification of available communication networks have been previously received and may continue the comparison of the next available identification. In item 110, the password may be generated by applying a cryptographic function parameterized with a secret value associated with the communication network to the identification. The method 100 may proceed with item 112 where, using the generated password, a connection to the available communication network is automatically established and the method may end in item 114.

Accordingly, the method 100 allows a client device to establish a connection with a communication network without complicated retrieval of a password, for example, by connecting to a provider of the communication network, scanning respective data and/or typing in the password. Rather, the password is automatically generated by using a cryptographic function associated with the communication network and used to directly establish a connection with the communication network.

For example, the communication device may be a smart device with an installed client application (or "app") that may be retrieved via a typical application distribution platform or via a link of a central entity enabling registration of the individual communication networks. The client app may reside on the smart device similar to any other application. Preferably, the client app may be further secured. Embedded within the client app may be information on available communication networks, such as Wi-Fi networks, for example a list of available communication networks or at least one pattern defining valid identifications of registered communication networks. Once the client device is within a range of a registered communication network as determined in items 106 and 108, the password for accessing the Wi-Fi network may be automatically generated in item 110. The communication device or the client app may further scan available Wi-Fi networks which may be within the range of a smart device or communication device. The communication device may search for matching identifications of registered communication networks as described above. If a plurality of registered communication networks are found, a user of the communication device may be enabled to manually select a preferred communication network. The automatically generated password enables the communication device to directly connect to the selected available Wi-Fi network.

Further to the information on available and/or registered communication networks, the client app may also store therein one or more of the secret values associated with individual registered communication networks. The secret values may be initially retrieved by the client app or may be retrieved via a dedicated communication link responsive to an initial attempt to access a registered communication network, for example, using the registered communication network or a mobile communication network. The secret values may remain valid for a certain period of time. The secret values may be updated periodically, pushed to the client app or pulled from the central entity. The secret values may also be directly retrieved in order to generate the password and may be deleted thereafter.

The secret values can have a smaller size than an actual password. Hence, a retrieval of the secret value requires a very low bandwidth of a couple of bytes. Since only the secret value, and not the actual password, is transmitted, the password cannot be directly extracted from the communication. Furthermore, an intruder without knowledge of the cryptographic function cannot generate the password even when the secret value is extracted from the communication. This improves the security level of providing automatic access to communication networks.

Figure 2:
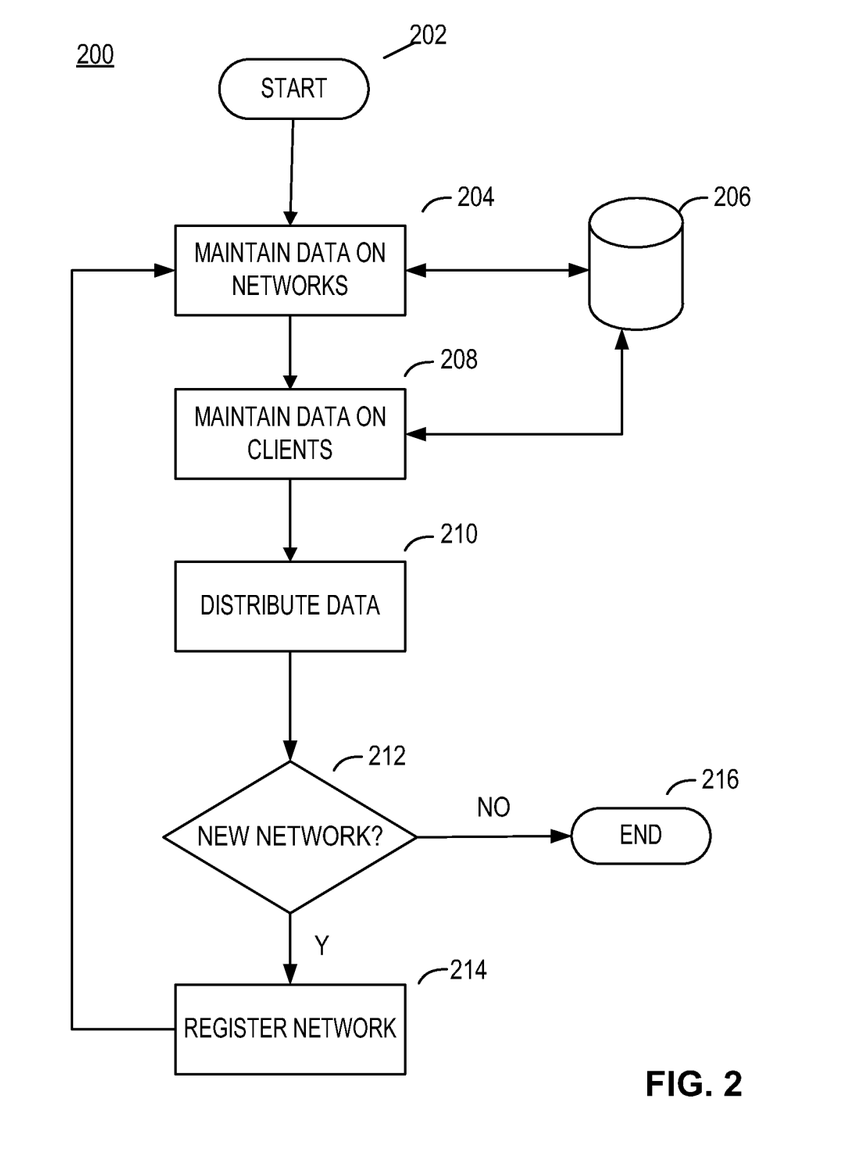
FIG. 2 shows a flow chart of a method for managing access to communication networks according to an embodiment of the present disclosure.

FIG. 2 depicts a flow chart of a method for managing access to communication networks according to one embodiment of the present disclosure. The method 200 may start in item 202. The method 200 may maintain data on a plurality of communication networks in item 204. For example, the data, which may include for each communication network an identification of the communication network, a cryptographic function and/or at least one secret value associated with the communication network, may be stored in a database 206.

The method 200 may proceed with item 208, wherein data on a plurality of client devices is maintained. The data on the client devices may comprise identification information, connectivity information, respective users of the client device, association and affiliation of the client devices with groups of client devices, such as communities and the like.

Each communication network may be accessible by one or more passwords, wherein at least one of the one or more passwords may be generated by application of the cryptographic function parameterized with the at least one secret value associated with the communication network to the identification of the communication network. During set up or registration of a communication network, the passwords may be generated and provided to the communication network. However, the passwords need not to be stored, for example, in the database 206 since they can be rebuilt using the cryptographic function, the secret value and the identification of the communication network.

The method 200 may proceed in item 210, wherein the data on the available communication networks including information on the identification of the communication network, the cryptographic function and/or the at least one secret value associated with the communication network may be distributed to at least some of the client devices. However, it is to be understood that the information need not be distributed at an initial state. Rather, if the identification of the communication network matches a pattern of registered communication networks and if the cryptographic function is known by the client devices, the client devices may request the secret value responsive to an attempt to connect to the registered communication network.

The method 200 may proceed in item 212 where it is determined whether a new network is to be registered. If a new network is to be registered the method may proceed with item 214 by receiving an identification of the new network. The identification of the new network may be checked to comply with regulations, rules or patterns of registered communication networks, such as a prefix or a suffix or any other expression. If the identification does not match the requirements of registered communication networks, either a valid identification of a registered communication network may be proposed or an updated identification of the new network complying with the requirements may be requested. As indicated by the back arrow to items 204 to 210, respective one or more passwords may be generated for the new network, and the data on the new network may be updated in database 206 and distributed to at least some of the client devices. If no new network is to be registered, the method 200 may end in item 216. Likewise, the method may continue in a listen mode in order to determine whether new networks are to be registered.

The method 200 may be used on a central entity or authority where a provider of a communication network, such as a business, university, administration or any other entity providing communication networks may register, for example, by creating an account and submitting data on the available communication network. The account creation process may include a registration and/or creation of an identification of the communication network, such as an SSID of a wireless network, which may include a reference to the central entity or authority followed by a name of the provider or any available name. The identification may be made up of upper and/or lower case letters or alphanumeric characters in any combination. As an example, an SSID may reflect the name of a business or institution providing the wireless network. By submitting the identification or SSID to the central entity or authority, at least one secure password may be automatically generated. The secure password may be returned to the provider of the communication network, which is required to set up the communication network according to the created one or more passwords and the chosen identification. For example, a Wi-Fi router may be configured using the one or more passwords and the chosen SSID. Once this is accomplished, the communication network is ready for use. Once the central entity or authority has generated the secret passwords, they can be deleted and the central entity or authority needs only to store the secret values associated with the communication network. On the other hand, the provider of the communication network is not required to have or, in some possible scenarios, must not have any knowledge of the (secret) cryptographic functions or the procedure by which the secret passwords have been generated.

Figure 3:
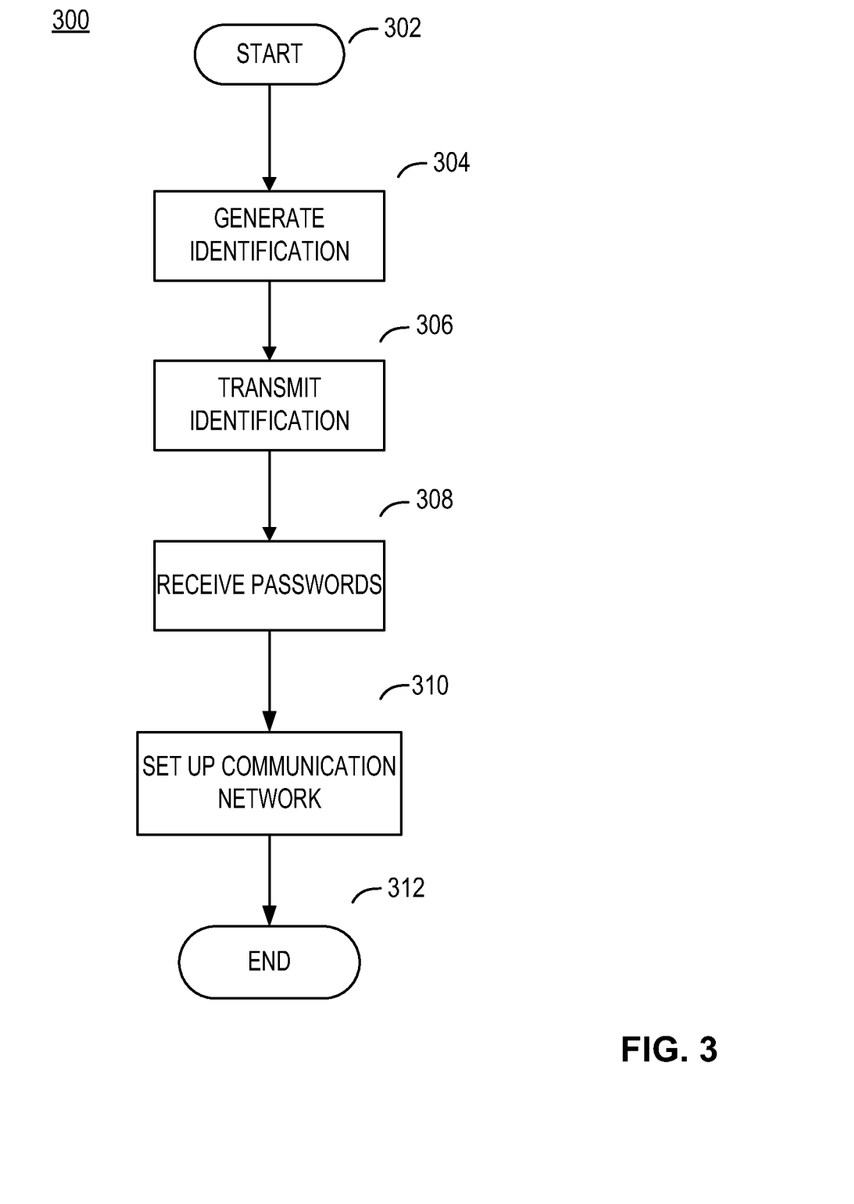
FIG. 3 shows a flow chart of a method for providing communication networks according to an embodiment of the present disclosure.

FIG. 3 shows another flow chart of a method for providing communication networks according to an embodiment of the present disclosure. The method 300 may be executed by a provider of a communication network and may start in item 302. The method 300 may proceed with item 304 where an identification for a communication network may be generated. The identification may include any alphanumeric combination and may include a readable representation of a name, for example of the provider of the communication network and of the communication network in any combination.

The method 300 may proceed with item 306, where the identification may be transmitted to a central entity in order to register the communication network with the central entity. The central entity may verify the identification for compliance with a pattern or rules for identifications of registered communication networks. If the identification does not comply with respective requirements, the central entity may request a modified identification of the communication network. If the identification complies with the requirements, the central entity may use the identification and generate at least one password for the communication network by using a cryptographic function parameterized with at least one secret value applied to the identification of the communication network. The generated passwords may be sent back to the provider and received in item 308.

The method 300 may proceed with item 310, where the identification generated in item 304 and the received passwords may be used to set up the communication network, for example by configuring a router in order to set up a wireless network. The method may end in item 312.

The method enables a simplified set-up of a communication network, wherein the passwords are generated by a central entity or authority using a cryptographic approach. A community of users operating respective client devices may be registered with the central entity or authority and may retrieve data from the central entity or authority in order to securely connect to the communication network by automatically creating respective passwords on demand. Hence, the provider of the communication network need not further distribute the passwords, nor is the provider of the communication network required to register new users. Rather, the communication network is accessible by all client devices of the community using the services of the central entity or authority.

Figure 4:
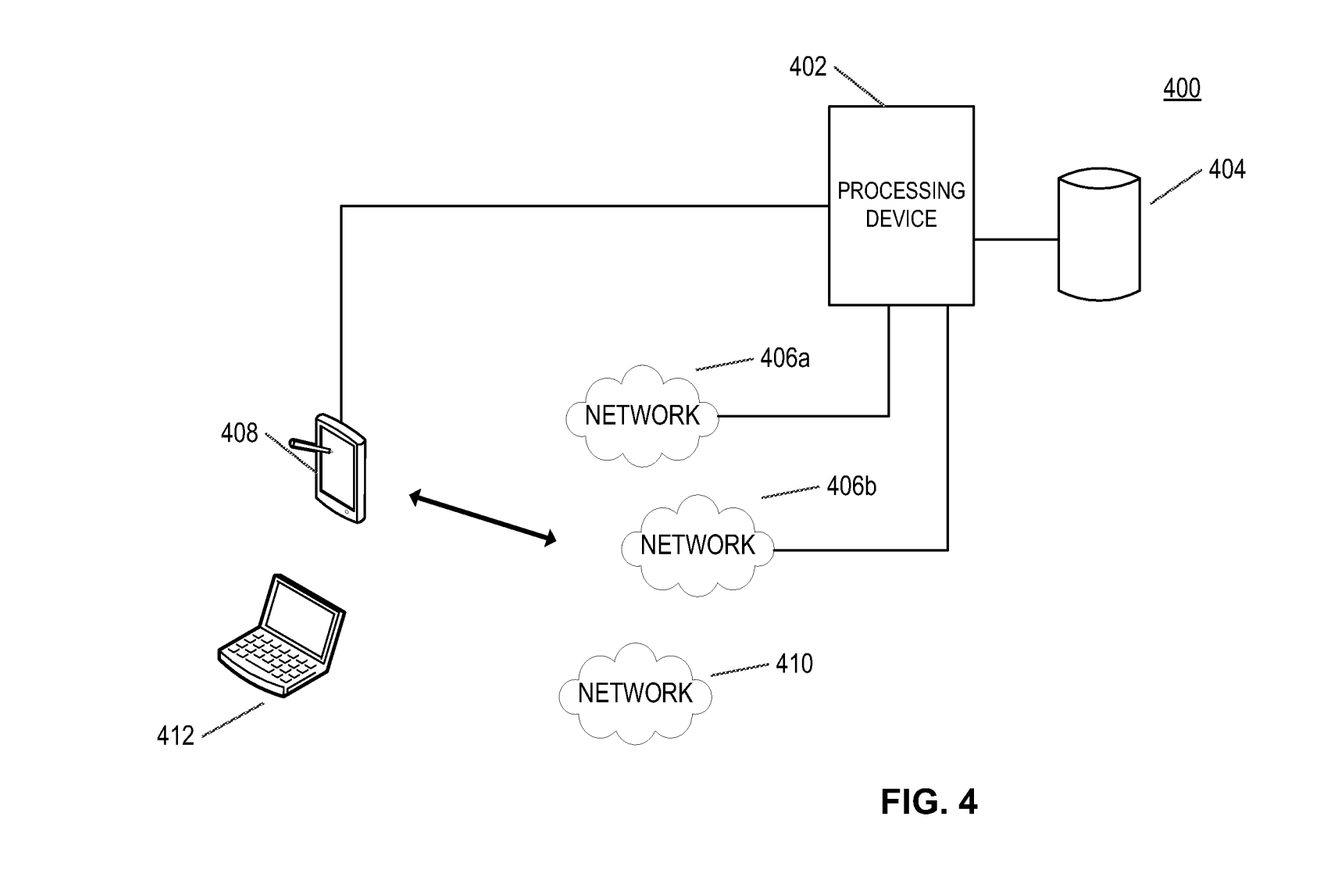
FIG. 4 shows a schematic overview of a service infrastructure according to one embodiment of the present disclosure.

FIG. 4 shows an infrastructure of a central entity according to one embodiment of the present disclosure. The infrastructure 400 may comprise at least one processing device 402, which may be connected to at least one database 404. The processing device 402 may be configured to perform the method 200 of FIG. 2. Likewise, the processing device 402 may access the database 404 similar to the database 206 of FIG. 2. The processing device 402 may enable registration of a plurality of networks 406a, 406b, and the data on the networks 406a, 406b may be stored in the database 404. Furthermore, the processing device may enable registration of communication devices, such as communication device 408. It is to be understood that even though only a single communication device 408 and only two communication networks 406a, 406b are shown, the embodiments are not restricted to a particular number of client devices or networks and may, rather, enable registration and maintenance of a large amount of devices 408 and networks 406a, 406b.

Accordingly, there may be three main parties involved in embodiments of the present disclosure, including the provider of the networks 406a, 406b, the central entity managing respective data and arbitrating between devices 408 and the networks 406a, 406b, and the users of the networks 406a, 406b operating respective devices 408.

Each network 406a, 406b may be registered with the processing device 402 by sending an identification of the networks 406a, 406b to the processing device 402, which may, in turn, generate secret passwords for the networks 406a, 406b by applying respective cryptographic functions, which may be different or the same cryptographic functions, to the identifications of the networks 406a, 406b. The networks 406a, 406b are set up with the generated passwords. A provider of a network 406a, 406b may execute the method 300 shown in FIG. 3, for example.

Furthermore, the device 408 may register with the processing device 402 and may receive information on identifications of available networks, such as the networks 406a, 406b. As soon as the device 408 is in the range of one of the networks 406a, 406b, the identification of the network 406a, 406b may be compared to the information on registered communication networks on the device 408 and if a registered communication network is identified, the password may be automatically generated by applying a parameterized cryptographic function to the identification of the identified network. The password may thereafter be used to directly connect to the network. Hence, for example if device 408 attempts to connect to the network 406b, the password may be automatically generated and the device 408 may be directly connected to network 406b. The communication device 408 may, for example, execute the method 100 shown in FIG. 1.

In contrast, if the device 408 attempts to connect to network 410, which may not be registered with the processing device 402, the device 408 may have to explicitly determine the required password for connecting to the network 410, such as by scanning a code or via RFID, connecting to a provider of the network 410 or in a similar way, which in comparison to a connection to the networks 406a, 406b is inconvenient and may discourage the user of device 408 to connect to the network 410. FIG. 4 further shows another device 412 which may not be registered at the processing device 402. Since the device 412 does not have any knowledge of registered networks 406a, 406b, it has to retrieve respective passwords using other techniques, which may be inconvenient and tedious. Furthermore, networks 406a, 406b need not enable retrieval of the passwords in any other way, thereby allowing only users of a community of registered devices 408 to connect to the networks 406a, 406b. Hence, the automatic access to networks according to embodiments of the present disclosure enables for a convenient and easy, yet controlled connection to registered networks by registered devices.

The device 408 may be any kind of electronic device, communication device or the like, such as a smart device. Furthermore, the networks 406a, 406b may be any type of wired or wireless communication network, such as 3G networks or Wi-Fi networks, enabling access to wide area networks, such as the Internet, or any other type of network. However, the present disclosure is not restricted to a particular type of device, network or communication protocol. Rather, any device, such as a portable computer or a personal computer, may be registered with the processing device 402 in order to connect to any kind of network, such as a wireless network or a wired LAN connection, that may be available in hotels, at airports or at other businesses or institutions, for example.

The device 408 may include a built-in GPS and other sensors in order to, for example, determine a location of the device 408. This may be used by the processing device 402 to determine a position of the device 408 with regard to available networks 406a, 406b and update the data on the device 408 with regard to a geolocation of the device 408.

Figure 5A:
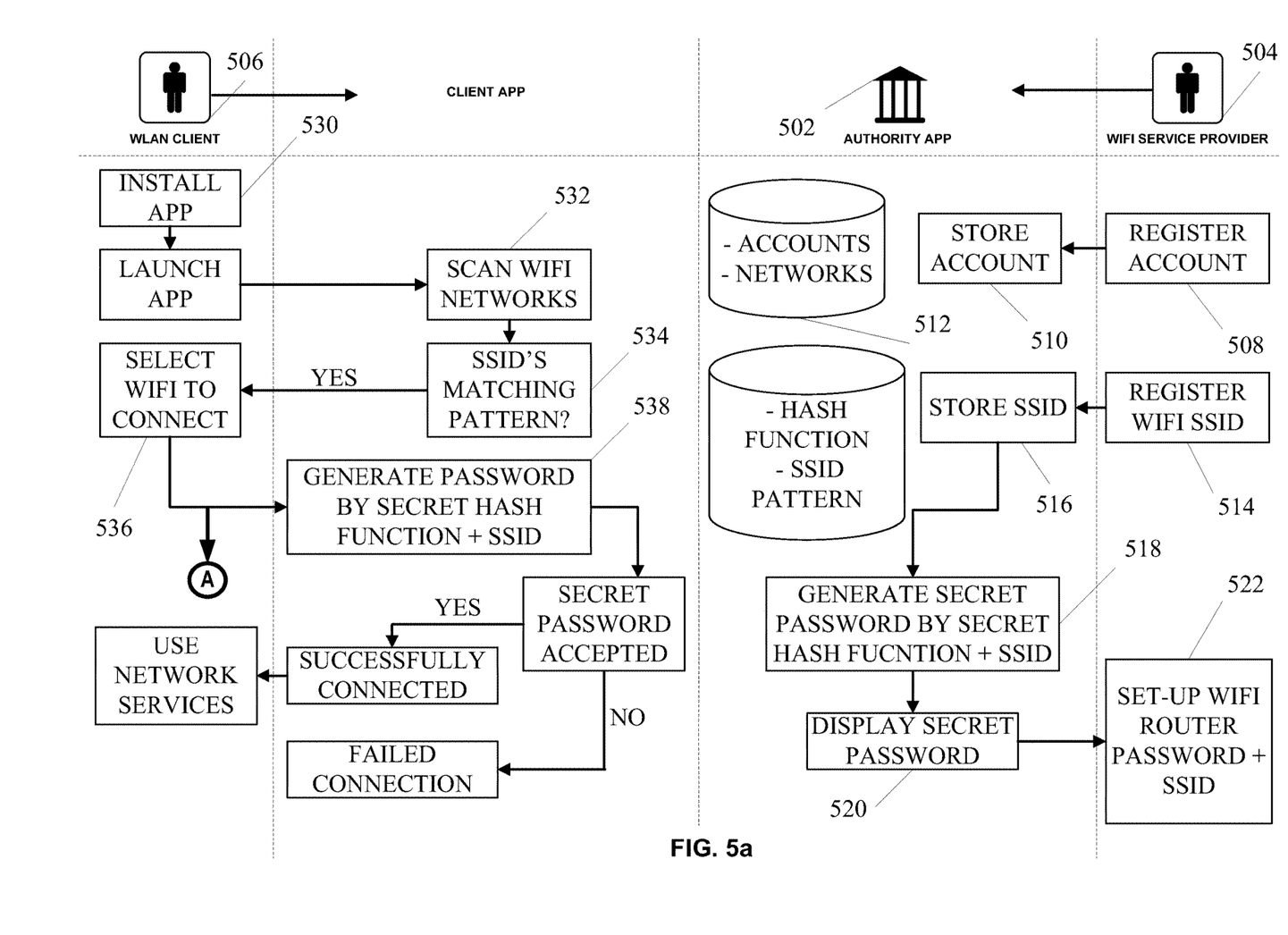
FIGS. 5a and 5b show flow charts of processing of a system according to one or more embodiments of the present disclosure.
Figure 5B:
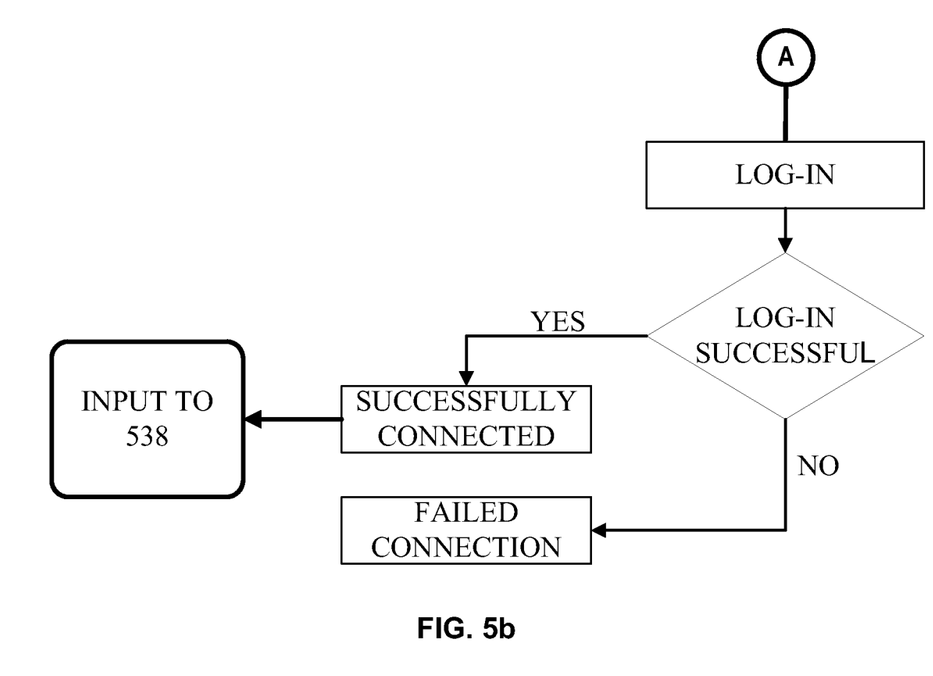

FIGS. 5a and 5b show a schematic overview of processing according to embodiments of the present disclosure. FIG. 5a shows an interaction of an authority 502 with one or more providers 504 and one or more clients 506. The authority 502, the providers 504 and the clients 506 may, for example, correspond to the processing device 402, the networks 406a, 406b, and the device 408, respectively, as described with regard to FIG. 4. The authority 502, the providers 504 and the clients 506 may perform methods according to embodiments of the present disclosure enabling the providers 504 to register individual communication networks with the authority 502 as described above. Furthermore, the clients 506 may interact with the authority in order to retrieve information about available communication networks and in order to enable an automatic connection to registered communication networks as described above.

The provider 504 may register an account in item 508, which may be stored by the authority 502 in item 510 in a database 512. The database 512 may correspond to the database 404 as shown in FIG. 4. However, it is to be understood that any other database may be used by the authority 502 to store respective accounts.

The provider 504 may generate an identification of a network, such as an SSID of a Wi-Fi network in item 514, in order to register the network with the authority 502. The authority may store the SSID in item 516 and may generate a secret password based on the SSID in item 518.

The authority may use a secret hash function and the SSID of the network to generate the secret password. For example, the password may be generated using the following pseudocode

```
var
    ssid = document.getElementById("ssid"),
    password = document.getElementById("password"),
    pwlen = 8,
    salt = 'Some secret.';
function secret_salt_fn(input) {
    return input + salt;
}
function makepwd(input) {
return Sha1.hash(secret_salt_fn(input)).substr(0, pwlen);
}
ssid.addEventListener("keyup", function( ) {
password.value = makepwd(ssid.value);
});
```

In the pseudocode, the secret hash function may be an SHA1 hash function, which may be parameterized using a secret value, such as a nonce, denoted as "salt" in the pseudocode.

After generation of the password, the secret password may be returned to the provider 504 in item 520, for example, by displaying or otherwise transmitting the secret and public passwords. In item 522, the provider 504 may set up the network, such as by setting up a Wi-Fi router using the password and the SSID in item 522.

After generation of the passwords, the authority 502 need not store any passwords. Rather, the authority 502 need only track the parameterized hash function and SSID patterns related to registered networks. The hash function and the SSID pattern may be predefined and shared between client 506 and the authorities 502.

After setting up respective networks by individual providers 504, a client 506 may automatically connect to the communication networks. In order to connect, the client 506 may install an application or a dedicated access module, which may be received from the authority 502, in item 530. After launching the app, the app may scan available communication networks in item 532 and may evaluate whether the received SSIDs of the Wi-Fi networks match the SSID pattern in item 534. If a matching SSID is found, a user of client 506 may be prompted to select one of the available networks to connect to, in item 536. After selecting one of the available networks the app or an access module may check whether the secret hash function is locally stored or not. If the secret hash function is known, the client 506 or the app or the access module may automatically generate the password by applying the secret hash function to the retrieved SSID in item 538, which may directly correspond to the processing of generation of the secret password in item 518. If the secret hash function is not locally known, for example, because the client 506 has not previously connected to the Wi-Fi network or has not initially received information on the secret hash functions, the client 506 may retrieve the secret hash function by following the path indicated as A, which is further described with regard to FIG. 5b.

Even though FIG. 5a shows the optional path A as taking place after a selection of a Wi-Fi network in item 536, the login process may be performed at any other suitable point in time, such as directly after a scan of available Wi-Fi networks or even during the scan of available Wi-Fi networks in item 532, and the selection of Wi-Fi networks in item 536 may be accompanied by an indication whether a secret hash function is available and/or has been retrieved.

If the password generated in item 538 is accepted by the network, the client 506 may connect to the network and use the network services.

To retrieve information on the secret hash function, the client 506 may establish a dedicated communication link with the authority 502. The dedicated communication link may be established via any registered communication network or via a different communication network, such as a mobile communication network. The client 506 may request the secret hash function from the authority 502 by submitting the SSID of a desired network to the authority 502. The authority 502 may verify the client 506 and provide the secret hash function to trusted clients 506 only. The secret hash function may be (temporarily) stored in the client 506 or the access module. The secret hash function may be discarded after generation of the password in item 538 and/or a successful login to the communication network. The dedicated communication link may be secured. For example, a secured channel may be established between the client 506 and the authority 502 in order to transmit the secret hash function.

In some embodiments, a plurality of secret values for a communication network may be stored by the authority. Each of the plurality of secret values may be associated with and distributed to individual clients according to one or more criteria, which may be related to a geolocation of clients and/or individual access points to communication networks. For example, different secret values or secret hash functions may be provided responsive to a location of the clients in individual cities, countries and the like. Furthermore, individual secret values or secret hash functions may be provided based on a prioritization of clients and/or access points, or based on available network resources, such as transmission bandwidth. This allows for a secure and simplified automatic access to communication networks responsive to individual connection parameters and availability of resources of registered communication networks.

The techniques described herein may be implemented in various computing systems, examples of which are described in greater detail above. Such systems generally involve the use of suitably-configured computing devices implementing a number of modules, each providing one or more operations needed to complete execution of such techniques. Each module may be implemented in its own way. As used herein, a module is a structural component of a system which performs an operational flow. A module may comprise computer-executable instructions, and may be encoded on a computer storage medium. Modules may be executed in parallel or serially, as appropriate, and may pass information between one another using a shared memory on the computer on which they are executed, using a message passing protocol or in any other suitable way. Furthermore, modules may be implemented as dedicated hardware or a combination of software and hardware in any combination.

While some embodiments have been described in detail, it is to be understood that the aspects of the present disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The embodiments of the invention in which an exclusive property or privilege is claimed are defined as follows:

1. A method for managing access to communication networks, comprising:
   maintaining data on a plurality of communication networks, including, for each communication network of the plurality of communication networks, an identification of the communication network and at least one secret value associated with the communication network, wherein the communication network is accessible by one or more passwords, at least one of the one or more passwords being generated by application of a cryptographic function parameterized with the at least one secret value to the identification of the communication network;
   maintaining data on a plurality of client devices;
   distributing information on the identifications of the plurality of communication networks and said at least one secret value to at least one of the plurality of client devices;
   receiving an identification of a further communication network that is not included in the plurality of communication networks;
   generating a password by applying a cryptographic function parameterized with a further secret value to the identification of the further communication network; and
   sending the password to a provider of the further communication network to enable the provider to set up the further communication network with the password, thereby enabling access to the further communication network using the password.

2. The method of claim 1, further comprising updating the data on the plurality of communication networks with data on the further communication network, including the identification and the secret value used to generate the at least one password.

3. The method of claim 1, further comprising updating at least some client devices with said identification of the further communication network.

4. A service infrastructure comprising one or more computing devices, at least one of the computing devices being configured to:
   maintain data on a plurality of communication networks, including, for each communication network of the plurality of communication networks, an identification of the communication network and at least one secret value associated with the communication network, wherein the communication network is accessible by one or more passwords, at least one of the one or more passwords being generated by application of a cryptographic function parameterized with the at least one secret value to the identification of the communication network;
   maintain data on a plurality of client devices;
   distribute information on the identifications of the plurality of communication networks and said at least one secret value to at least one of the plurality of client devices;
   update the at least one secret value associated with a first communication network of the plurality of communication networks;
   generate a new password by applying the cryptographic function parameterized with the updated at least one secret value to the identification of the first communication network; and
   send the new password to a provider of the first communication network to enable the provider to set up the first communication network with the new password, thereby enabling access to the first communication network using the new password.

5. A service infrastructure comprising one or more computing devices, at least one of the computing devices being programmed to perform steps comprising:

maintaining data on a plurality of communication networks, including, for each communication network of the plurality of communication networks, an identification of the communication network and at least one secret value associated with the communication network, wherein the communication network is accessible by one or more passwords, at least one of the one or more passwords being generated by application of a cryptographic function parameterized with the at least one secret value to the identification of the communication network;

maintaining data on a plurality of client devices;

distributing information on the identifications of the plurality of communication networks and said at least one secret value to at least one of the plurality of client devices;

receiving an identification of a further communication network that is not included in the plurality of communication networks;

generating a password by applying a cryptographic function parameterized with a further secret value to the identification of the further communication network; and sending the password to a provider of the further communication network to enable the provider to set up the further communication network with the password, thereby enabling access to the further communication network using the password.

6. The service infrastructure of claim 5, wherein the at least one computing device is programmed to perform further steps comprising updating the data on the plurality of communication networks with data on the further communication network, including the identification and the secret value used to generate the at least one password.

7. The service infrastructure of claim 5, wherein the at least one computing device is programmed to perform further steps comprising updating at least some client devices with said identification of the further communication network.

8. The service infrastructure of claim 5, wherein the cryptographic function is a one-way cryptographic function.

9. The service infrastructure of claim 5, wherein the further communication network is a wireless communication network and wherein the identification of the further communication network is an SSID of the wireless communication network.

10. A method for managing access to communication networks, comprising:

maintaining data on a plurality of communication networks, including, for each communication network of the plurality of communication networks, an identification of the communication network and at least one secret value associated with the communication network, wherein the communication network is accessible by one or more passwords, at least one of the one or more passwords being generated by application of a cryptographic function parameterized with the at least one secret value to the identification of the communication network;

maintaining data on a plurality of client devices;

distributing information on the identifications of the plurality of communication networks and said at least one secret value to at least one of the plurality of client devices;

updating the at least one secret value associated with a first communication network of the plurality of communication networks;

generating a new password by applying the cryptographic function parameterized with the updated at least one secret value to the identification of the first communication network; and sending the password to a provider of the first communication network.

11. The method of claim 10, wherein the cryptographic function is a one-way cryptographic function.

12. The method of claim 10, wherein the first communication network is a wireless communication network and wherein the identification of the first communication network is an SSID of the wireless communication network.

* * * * *